(12) United States Patent
Cohen et al.

(10) Patent No.: US 7,263,489 B2
(45) Date of Patent: Aug. 28, 2007

(54) DETECTION OF CHARACTERISTICS OF HUMAN-MACHINE INTERACTIONS FOR DIALOG CUSTOMIZATION AND ANALYSIS

(75) Inventors: Michael H. Cohen, Burlingame, CA (US); Larry P. Heck, Los Altos, CA (US); Jennifer E. Balogh, Fremont, CA (US); James M. Riseman, San Francisco, CA (US); Naghmeh N. Mirghafori, Fremont, CA (US)

(73) Assignee: Nuance Communications, Inc., Burlington, MA (US)

( * ) Notice: Subject to any disclaimer, the term of this patent is extended or adjusted under 35 U.S.C. 154(b) by 795 days.

(21) Appl. No.: 10/046,026

(22) Filed: Jan. 11, 2002

(65) Prior Publication Data

US 2002/0095295 A1 Jul. 18, 2002

Related U.S. Application Data

(63) Continuation-in-part of application No. 09/412,173, filed on Oct. 4, 1999, which is a continuation-in-part of application No. 09/203,155, filed on Dec. 1, 1998.

(51) Int. Cl.
*G10L 21/00* (2006.01)
(52) U.S. Cl. .............. 704/270; 704/270.1; 379/265.01; 379/256
(58) Field of Classification Search ................ 704/270, 704/270.1; 379/265.01–265.25
See application file for complete search history.

(56) References Cited

U.S. PATENT DOCUMENTS

| | | | |
|---|---|---|---|
| 4,348,550 A | 9/1982 | Pirz et al. | |
| 4,887,212 A | 12/1989 | Zamora et al. | |
| 4,974,191 A | 11/1990 | Amirghodsi et al. | |
| 5,442,780 A | 8/1995 | Takanashi et al. | |
| 5,526,463 A | * 6/1996 | Gillick et al. | ............... 704/251 |
| 5,548,631 A | 8/1996 | Krebs et al. | |

(Continued)

OTHER PUBLICATIONS

Sharon Nash, "A Passport to Web Shopping," ZD Net, PC Magazine Trends, pp. 1-3, downloaded from http://www.zdnet.com/pcmag/stories/trends/0,7607,2308752,00.html, Aug. 9, 1999.

(Continued)

*Primary Examiner*—Michael N Opsasnick
(74) *Attorney, Agent, or Firm*—Blakely Sokoloff Taylor & Zafman LLP

(57) ABSTRACT

A system which uses automatic speech recognition to provide dialogs with human speakers automatically detects one or more characteristics, which may be characteristics of a speaker, his speech, his environment, or the speech channel used to communicate with the speaker. The characteristic may be detected either during the dialog or at a later time based on stored data representing the dialog. If the characteristic is detected during the dialog, the dialog can be customized for the speaker at an application level, based on the detected characteristic. The customization may include customization of operations and features such as call routing, error recovery, call flow, content selection, system prompts, or system persona. Data indicative of detected characteristics can be stored and accumulated for many speakers and/or dialogs and analyzed offline to generate a demographic or other type of analysis of the speakers or dialogs with respect to one or more detected characteristics.

38 Claims, 8 Drawing Sheets

U.S. PATENT DOCUMENTS

| | | | |
|---|---|---|---|
| 5,603,031 A | 2/1997 | White et al. | |
| 5,608,624 A | 3/1997 | Luciw | |
| 5,689,669 A | 11/1997 | Lynch et al. | |
| 5,692,187 A | 11/1997 | Goldman et al. | |
| 5,724,481 A * | 3/1998 | Garberg et al. | 704/243 |
| 5,732,216 A * | 3/1998 | Logan et al. | 709/203 |
| 5,754,770 A | 5/1998 | Shiels et al. | |
| 5,774,860 A | 6/1998 | Bayya et al. | |
| 5,790,044 A | 8/1998 | Lin et al. | |
| 5,809,269 A | 9/1998 | Favot et al. | |
| 5,854,999 A * | 12/1998 | Hirayama | 704/226 |
| 5,905,773 A | 5/1999 | Wong | |
| 5,915,001 A | 6/1999 | Uppaluru | |
| 5,933,490 A * | 8/1999 | White et al. | 379/221.01 |
| 6,098,043 A | 8/2000 | Forest et al. | |
| 6,108,629 A | 8/2000 | Kasday | |
| 6,178,404 B1 | 1/2001 | Hambleton et al. | |
| 6,233,556 B1 | 5/2001 | Teunen et al. | |
| 6,233,559 B1 * | 5/2001 | Balakrishnan | 704/275 |
| 6,240,448 B1 * | 5/2001 | Imielinski et al. | 709/218 |
| 6,246,981 B1 | 6/2001 | Papineni et al. | |
| 6,359,981 B1 * | 3/2002 | Neyman et al. | 379/265.09 |
| 6,400,806 B1 | 6/2002 | Uppaluru | |
| 6,415,257 B1 * | 7/2002 | Junqua et al. | 704/275 |
| 6,487,534 B1 | 11/2002 | Thelen et al. | |
| 6,493,671 B1 * | 12/2002 | Ladd et al. | 704/270 |
| 6,493,673 B1 | 12/2002 | Ladd et al. | |
| 6,501,832 B1 | 12/2002 | Saylor et al. | |
| 6,522,875 B1 | 2/2003 | Dowling et al. | |
| 6,539,359 B1 | 3/2003 | Ladd et al. | |
| 6,560,576 B1 | 5/2003 | Cohen et al. | |

OTHER PUBLICATIONS

"MSN Previews New Version of MoneyCentral, Offers Award-Winning Investment Services for Free," pp. 1-5, downloaded from http://www.Microsoft.com/presspass/press/1999/jul99/InvestmentservicePR.htm, Aug. 9, 1999.

"VerticalOne Launches Service Giving Internet Users One-Stop Access to Their Personal Account Information", VerticalOne Corporation, pp. 1-3, downloaded from http://www.verticalone.com/pr/pr80299.html, Aug. 9, 1999.

About Us, Corporate Profile, VerticalOne Corporation, pp. 1-2, downloaded from http://www/verticalone.com.about.html, Aug. 9, 1999.

VerticalOne Advantage, pp. 1-2, downloaded from http://www.verticalone.com/advantage.html, Aug. 9, 1999.

"VerticalOne Corporation to Offer Internet Users One-Stop for Managing Online Personal Content and Account Information", VerticalOne Corporation, pp. 1-2, downloaded from http://www.verticalone.com/pr/pr52599.html, Aug. 9, 1999.

* cited by examiner

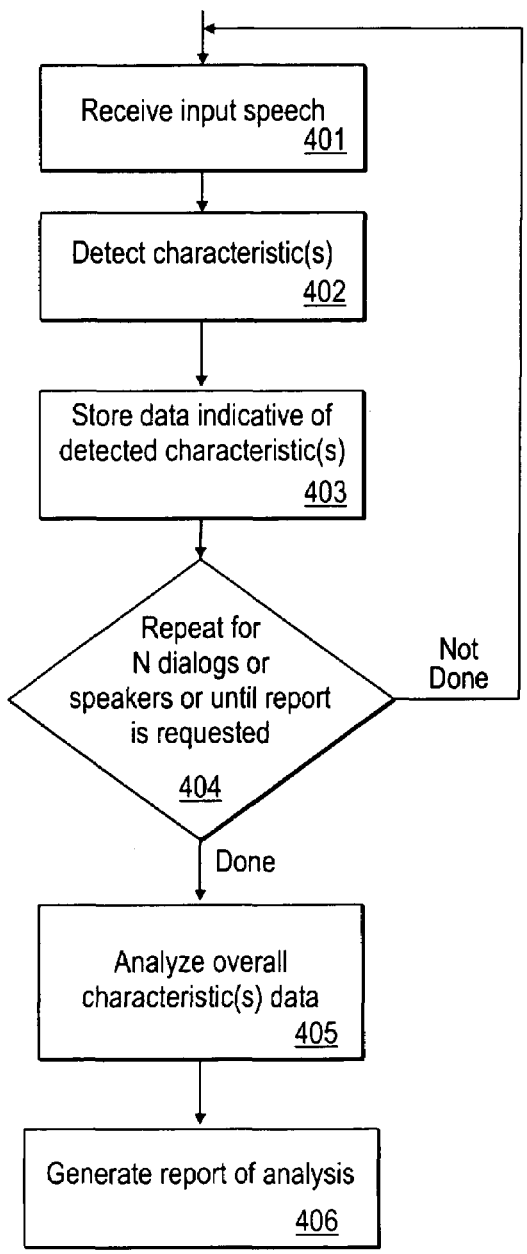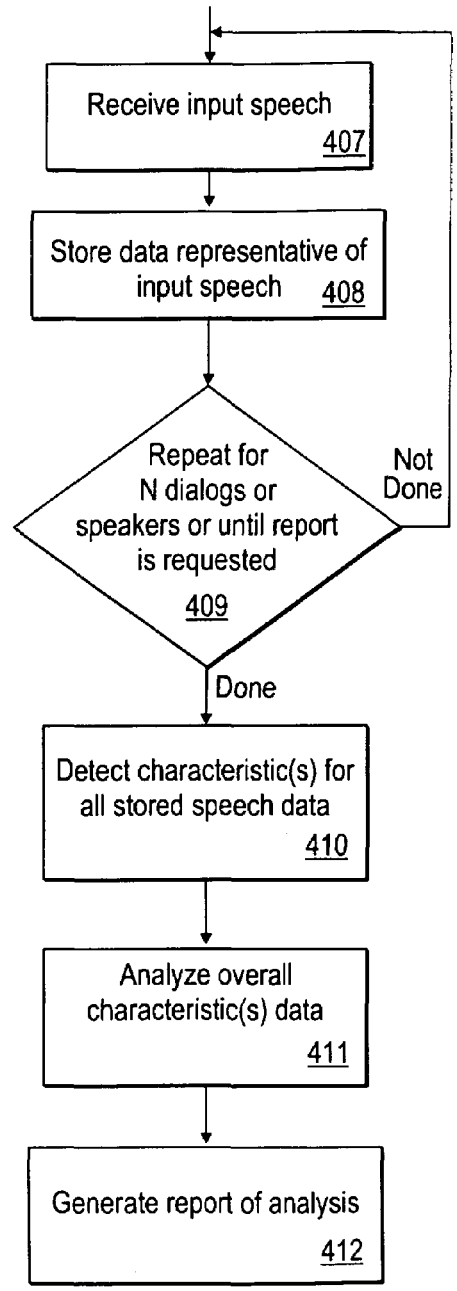
Fig. 4A
Fig. 4B

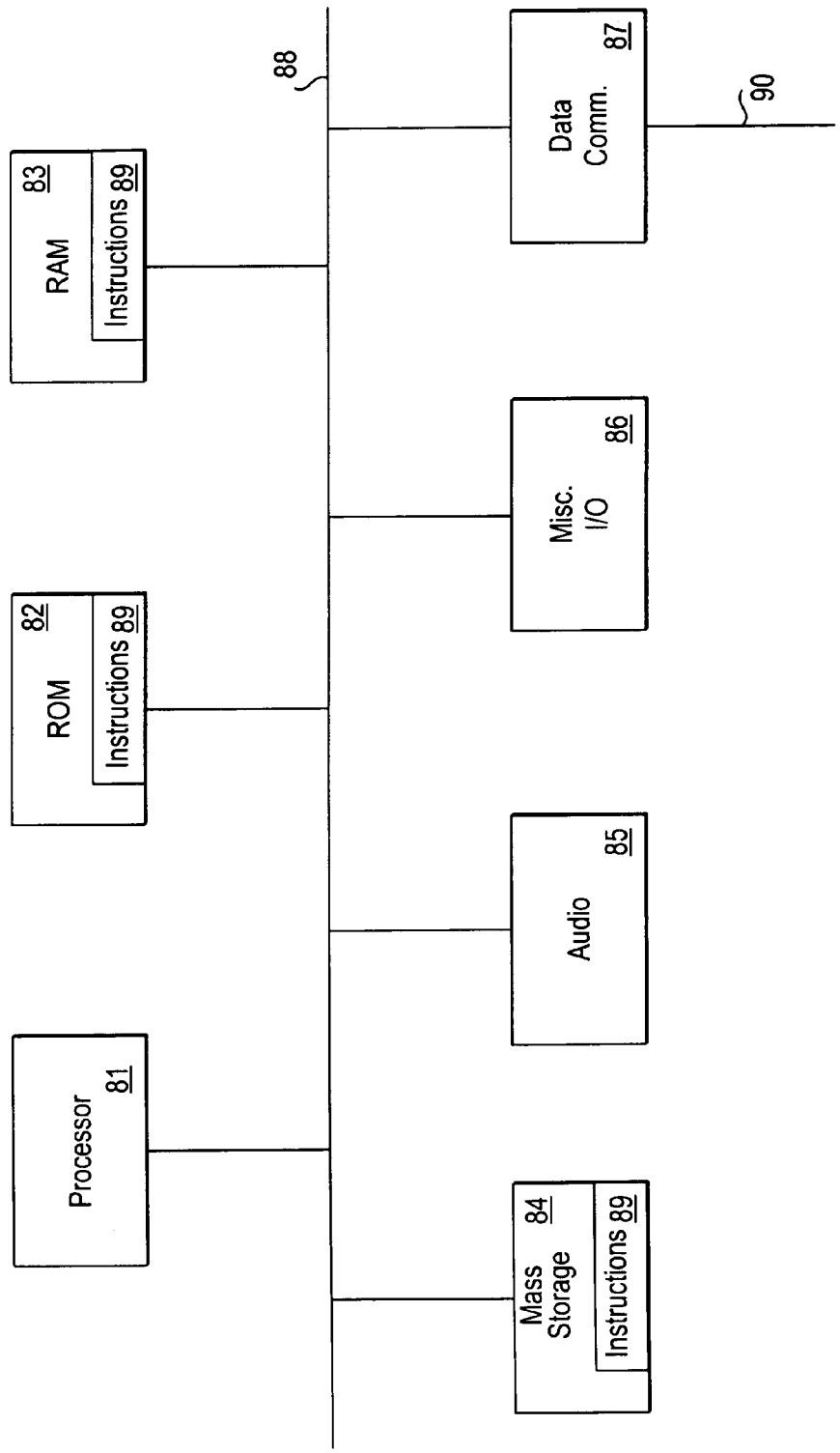

DETECTION OF CHARACTERISTICS OF HUMAN-MACHINE INTERACTIONS FOR DIALOG CUSTOMIZATION AND ANALYSIS

This is a continuation-in-part of U.S. patent application Ser. No. 09/412,173, filed on Oct. 4, 1999 and entitled, "Method and Apparatus for Optimizing a Spoken Dialog Between a Person and a Machine", which is a continuation-in-part of U.S. patent application Ser. No. 09/203,155, filed on Dec. 1, 1998 and entitled, "System and Method for Browsing a Voice Web", each of which is incorporated herein by reference in its entirety.

FIELD OF THE INVENTION

The present invention pertains to systems which use automatic speech recognition. More particularly, the present invention relates to detection of characteristics of human-machine interactions for purposes of dialog customization and analysis.

BACKGROUND OF THE INVENTION

Speech applications are rapidly becoming commonplace in everyday life. A speech application may be defined as a machine-implemented application that performs tasks automatically in response to speech of a human user and which responds to the user with audible prompts, typically in the form of recorded or synthesized speech. For example, speech applications may be designed to allow a user to make travel reservations or buy stock over the telephone, without assistance from a human operator. The interaction between the person and the machine is referred to as a dialog.

Automatic speech recognition (ASR) is a technology used to allow machines to recognize human speech. Commonly, an ASR system includes a speech recognition engine, which uses various types of data models to recognize an utterance. These models typically include language models, acoustic models, grammars, and a dictionary.

It is desirable for speech applications and speech recognition systems to provide more personalized experiences for their users and to respond more intelligently to the users and their environments. In addition, it is desirable to have the ability to analyze accumulated data representing dialogs, to identify demographics and other characteristics of the users and their environments.

SUMMARY OF THE INVENTION

According to one aspect of the present invention, an audio-based dialog between a person and a machine is established, wherein the person uses a communication device to communicate with the machine. A characteristic is automatically detected during the dialog in real time, wherein the characteristic is not uniquely indicative of any of: the identity of the person, the identity of the specific communication device, or any user account. The dialog is then customized at an application level, based on the detected characteristic.

According to another aspect of the present invention, multiple audio-based dialogs are provided, each between a person and a machine, wherein each person uses a communication device to communicate with the machine during the corresponding dialog. Each of the dialogs is examined to automatically detect a characteristic for at least some of the dialogs, wherein the characteristic is not uniquely indicative of any of: the identity of the person, the identity of the specific communication device, or any user account. An overall characterization of the dialogs is then generated with respect to the characteristic.

The present invention further includes an apparatus corresponding to each of these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 4 illustrates two embodiments of a process for analyzing dialog data based on detected characteristics;

FIG. 8 is a high-level block diagram of a processing system in which the speech recognition system can be implemented.

DETAILED DESCRIPTION

Figure 1:
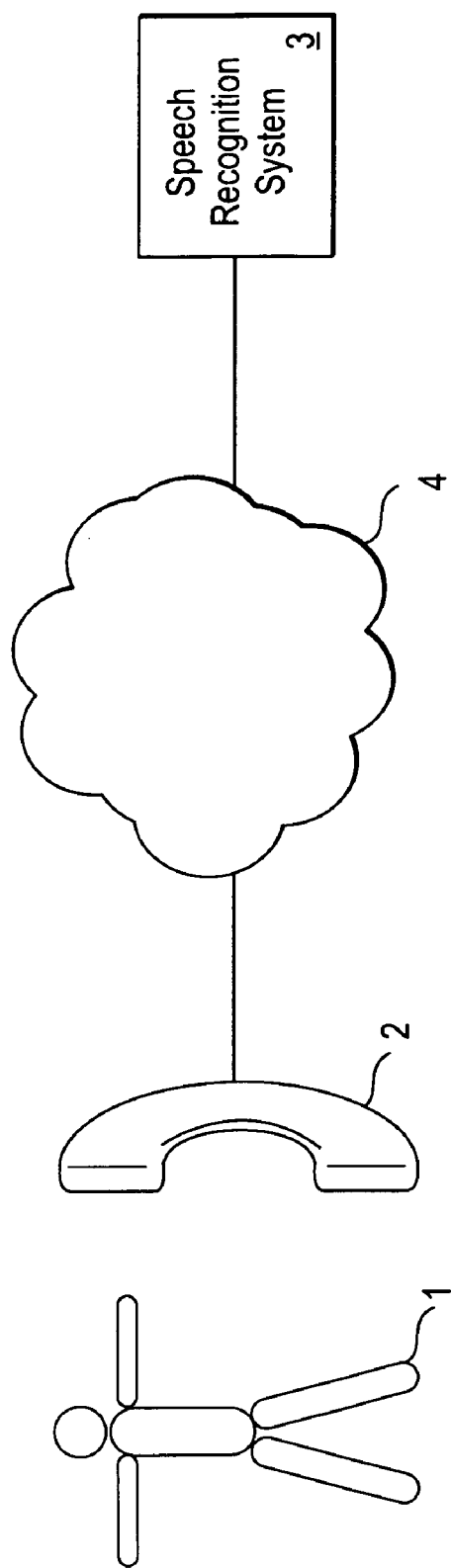
FIG. 1 illustrates a network configuration in which a person communicates with a speech recognition system.

Described below are a method and apparatus for customizing a human-machine dialog or analyzing data relating to human-machine dialogs, based on detection of characteristics associated with one or more dialogs. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated, and except as will be readily apparent to those skilled in the art. For example, a feature, structure, act, etc. described in one embodiment may also be included in other embodiments. Thus, the present invention can include a variety of combinations and/or integrations of the embodiments described herein.

I. Overview

As described in greater detail below, a speech recognition system automatically detects one or more characteristics associated with a dialog and uses the detected characteristic(s) to customize (personalize) the dialog for the human speaker in real-time at the application level. A customized dialog provides the speaker with a richer, more efficient and more enjoyable experience. Customizing a dialog "at the application level" may involve, for example, customizing features such as call routing, error recovery, call flow, content selection, system prompts, or the speech recognition system's persona.

In addition (or as an alternative) to customizing a dialog, detected characteristics may be used to generate an offline analysis of dialog data. Off-line analysis of dialog data based on detected characteristics can be used for many purposes, such as to enable marketing professionals to understand the demographics of their callers (e.g., age, gender, accent, etc.). These demographics can be used to improve service, enhance targeted advertising, etc.

The characteristics that are automatically detected by the system may include, for example, characteristics of the speaker, his speech, his environment, or the speech channel (e.g., the type of communication device used by the speaker to communicate with the speech recognition system). The system described herein is not specifically directed to detecting characteristics that uniquely identify a speaker, his communication device or user account (e.g., caller ID information, automatic number identification (ANI), device IDs, user IDs, and the like); nonetheless, embodiments of the system may detect such information in addition to detecting the characteristics mentioned below.

The system described herein improves the user's experience by detecting one or more of a broad range of characteristics, some of which are quite subtle and difficult to detect without directly asking the speaker. Thus, the system automatically detects various personalizing statistical classifications and direct measurements of signal characteristics. The statistical classifications can include information about the speaker and/or the acoustics associated with the immediate environment of the speaker and the current communication link (e.g., telephone connection). The detected speaker characteristics may be, for example: the gender of the speaker, the type of speech being spoken by the speaker (e.g., side speech, background speech, fast speech, slow speech, accented speech), the emotional state of the speaker, whether the speaker is telling the truth, the approximate age of the speaker, the physical orientation of the speaker (e.g. standing, sitting, walking), and/or the apparent health of the speaker (e.g. sick, congested, etc.).

The acoustic characteristics that are automatically detected by the system may include, for example: the channel type (e.g., hands-free mobile telephone vs. hand-held mobile telephone, type of codec, quality of transmission, microphone type), classifications of the speaker's acoustic environment (e.g., in a car, in a car on a highway, in an airport or crowded hall, at a restaurant or noisy bar, on a sidewalk of a busy street, at home, at work).

The direct measurements of the signal characteristics may include, for example, the level (e.g., energy) of the speech, the level of the background noise (described on a dB scale), and the signal-to-noise ratio (SNR), which is the difference of these on dB scale, reverberance, etc.

Other characteristics of the call might also be captured for various purposes, such as detecting causes of errors and customizing error recovery strategies. These characteristics may include, for example, the history of previous errors, the length of the speaker's utterance, the utterance's confidence score, the prompt duration, the amount of time it took the speaker to start speaking after the prompt, and whether or not the speaker barged-in over the prompt.

The statistical characterizations of the speaker and acoustics can be made with a statistical classifier. A statistical classifier and a process to train and use it are described below.

FIG. 1 illustrates a network configuration in which a person may communicate with a speech recognition system in accordance with the present invention. The person 1 uses a communication device 2, such as a telephone, to communicate with speech recognition system 3. The communication may take place over a network 4, which may be or may include, for example, the public switched telephone network (PSTN), a wireless telecommunications network, one or more computer networks (e.g., the Internet, a campus intranet, a local area network, a wide area network), or a combination thereof. Note, however, that the speaker 1 could alternatively have a direct audio interface to the system 3, rather than through a network.

Figure 2:
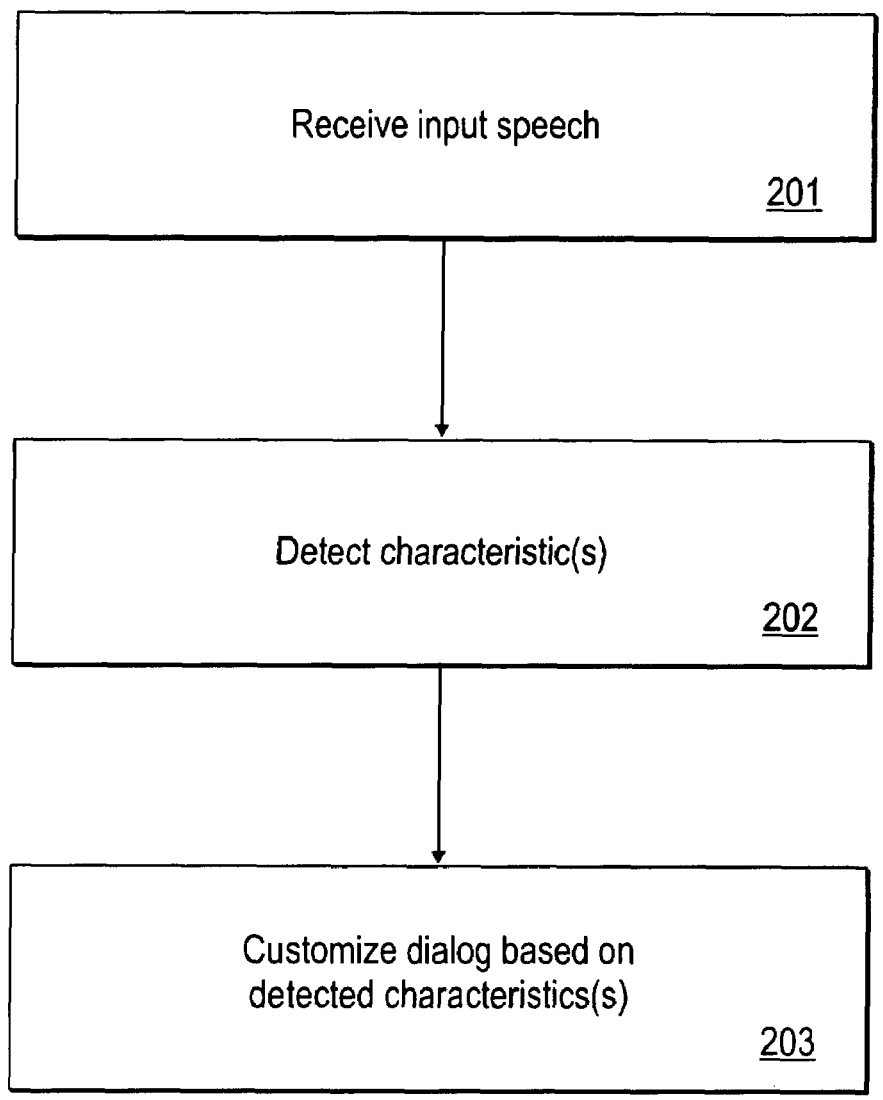
FIG. 2 illustrates a process of customizing dialog based on detected characteristics, according to one embodiment.

FIG. 2 illustrates a process, according to one embodiment, by which the speech recognition system 3 customizes a dialog with the speaker 1, based on one or more characteristics detected automatically by the system 3. At block 201 the system 3 receives in the speech from the speaker 1 during a dialog with the speaker 1. At block 202 the system 3 automatically detects one or more characteristics associated with the dialog, such as any of those mentioned above. Techniques for detecting such characteristics are described in greater detail below. At block 203, the system 3 customizes the dialog for the speaker 1 based on the detected characteristic(s). As mentioned above, the system 3 may also detect and or analyze off-line the characteristics of one or more dialogs, as described further below.

Figure 3:
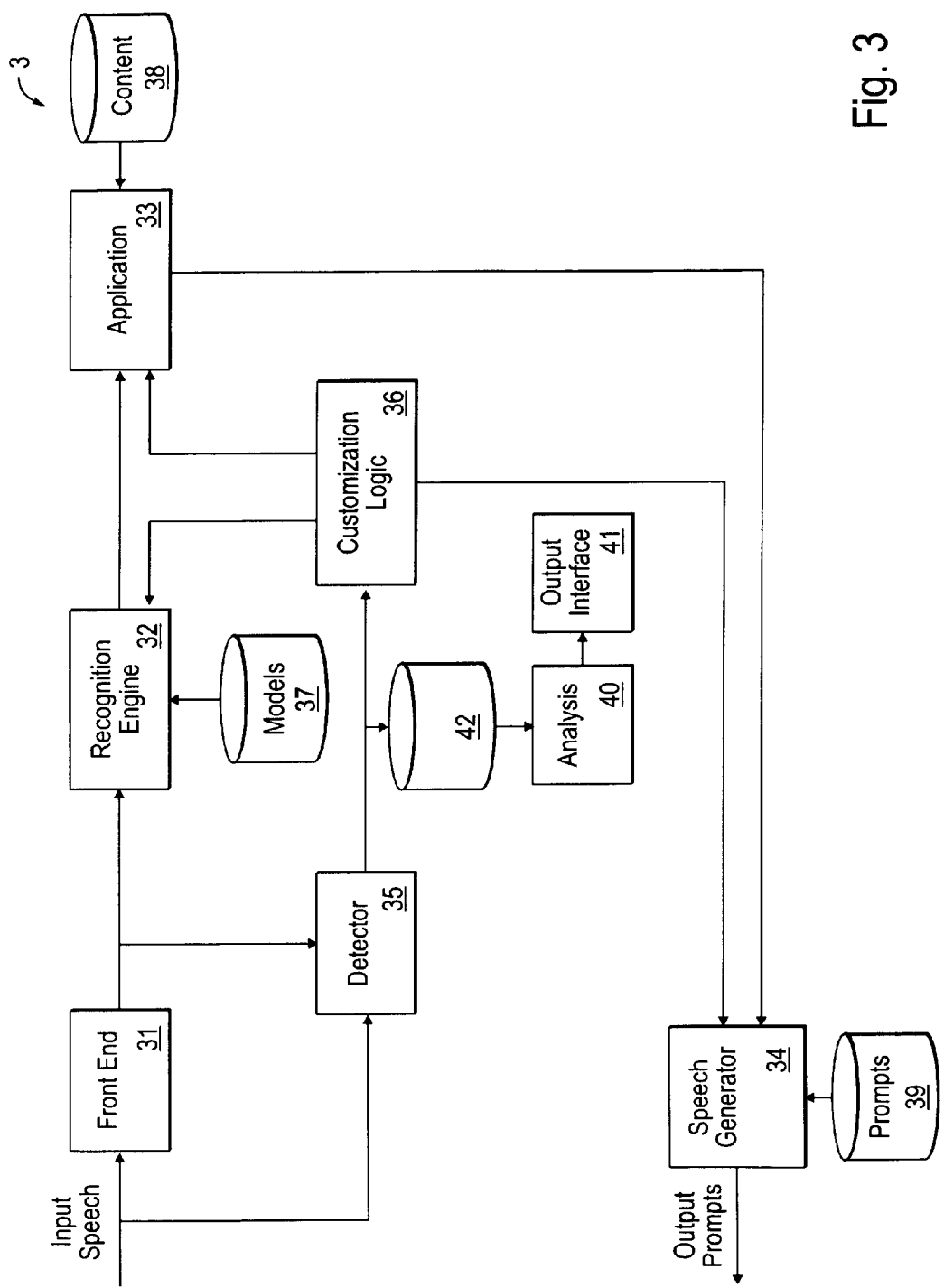
FIG. 3 illustrates an embodiment of the speech recognition system.

FIG. 3 illustrates in greater detail the speech recognition system 3, according to one embodiment. The system 3 includes a front end 31, a recognition engine 32, a speech application 33, a speech generator 34, a characteristic detector 35, and customization logic 36. The system 3 further includes a set of models 37, content 38 used by the speech application 33, and a set of prompts 39. The system 3 may also include an offline analysis module 40 and an output interface 41, as described below.

An input speech signal is received by the front end 31 via a microphone, telephony interface, computer network interface, or any other conventional communications interface. The front end 31 is responsible for processing the speech waveform to transform it into a sequence of data points that can be better modeled than the raw waveform. Hence, the front end 31 digitizes the speech waveform (if it is not already digitized), endpoints the speech, and extracts feature vectors from the digitized speech representing spectral components of the speech. In some embodiments, endpointing precedes feature extraction, while in others feature extraction precedes endpointing. The extracted feature vectors are provided to the recognition engine 32, which references the feature vectors against the models 37 to generate recognized speech data. The models 37 include a dictionary, acoustic models, and recognition grammars and/or language models.

The recognition engine 32 provides the recognized speech to the speech application 33. The speech application 33 is the component of the system which is responsible for performing application-level functions that fulfill the speaker's purpose for contacting the system 3, such as providing stock quotes, booking travel reservations, or performing online banking functions. The speech application 33 may include a natural language interpreter (not shown) to interpret the meaning of the recognized speech. The speech application 33 accesses content 38 in response to the speaker's speech and uses the content 38 to perform its application-level functions. The content 38 may include audio, text, graphics, images, multimedia data, or any combination thereof. When appropriate, the speech application 33 causes content to be output to the speaker by the speech generator 34, by a graphical user interface (not shown), or by any other type of user interface suitable for the content type.

The speech generator 34 outputs recorded or synthesized speech to the user, typically over the same communication channel by which the users speech is received by the system 3. The speech generator 34 outputs the speech in response to signals from the speech application 33 and, in some cases, based on the content provided by the speech application 33. The speech generator 34 also responds to the speech application 33 by selecting various prompts 39 to be output to the speaker.

The characteristic detector 35 automatically detects characteristics, such as any of those mentioned above. Depending on the type of characteristic(s) to be detected, the detector 35 may detect the characteristics from the raw input speech, the feature vectors output by the front-end, or both. Detected characteristics are provided to the customization logic 36 and/or are stored in a database 42 for later use (e.g., by the analysis module 40).

In response to receiving detected characteristics from the detector 35, the customization logic 36 provides control signals to other components of the system 3 to customize the dialog for the speaker at the application level in real-time. To do this, the customization logic 36 may control: the recognition engine 32, the speech application 33, or the speech generator 34, for example. As described further below, examples of application-level customizations that can be performed during a dialog include customized call routing, error recovery, call flow, content selection and delivery, prompt selection and delivery, grammar selection, and persona selection.

In one embodiment, the speech recognition system 3 includes an analysis module 40 to perform off-line analysis of the stored data representing detected characteristics, and an output interface 41 to output reports of such analyses. These components can be used to provide, among other things, demographic reports with respect to one or more specified characteristics (e.g., callers' age, gender, or nationality), based on large samples of speakers and/or dialogs. Note, however, that the system 3 can be implemented without the analysis module 40 and the output interface 41, as described above. In another embodiment, the analysis module 40 and the output interface 41 are implemented separately, i.e., independent from the illustrated speech recognition system 3, although the analysis module 40 still has access to the data 42 representing detected characteristics in such an embodiment.

In yet another embodiment, the characteristic detector 35 is implemented in a separate system, with the analysis module 40 and the output interface 41. In such an embodiment, the detection of characteristics is also performed off-line, based on stored speech data (representing raw speech, feature vectors, or recognized speech), and analyses and reports are generated off-line as described above.

FIGS. 4A and 4B illustrate two embodiments of a process for off-line analysis of dialog data based on detected characteristics, according to one embodiment. In the embodiment of FIG. 4A, the detection of characteristics is performed in real-time (i.e., during the dialogs), whereas in the embodiment of FIG. 4B the detection of characteristics is performed off-line based on stored data. Referring first to FIG. 4A, at block 401 the system receives input speech from the speaker. At block 402 the system detects one or more specified characteristics, such as any of those mentioned above. A technique for detecting the characteristics is described in greater detail below. The system then stores data indicative of the detected characteristic(s) at block 403. The foregoing operations are then repeated for a predetermined number N of dialogs or speakers, or until a report is requested (block 404). When sufficient data is collected or a report is requested, the system analyzes the data with respect to the detected characteristic(s) at block 405 and generates a report of the analysis at block 406. The analysis and report may provide, for example, demographic information with respect to one or more specified characteristics, for a large sample of speakers or dialogs.

In the process of FIG. 4B, at block 407 the system receives input speech from the speaker. At block 408 the system stores data representative of the input speech (i.e., representing raw speech, feature vectors, or recognized speech). The foregoing operations are repeated for a predetermined number N of dialogs or speakers, or until a report is requested (block 409). At block 410 the system detects one or more specified characteristics based on the stored data. The system analyzes the characteristics data at block 411 and generates a report of the analysis at block 412.

II. Characteristic Detection

Figure 5:
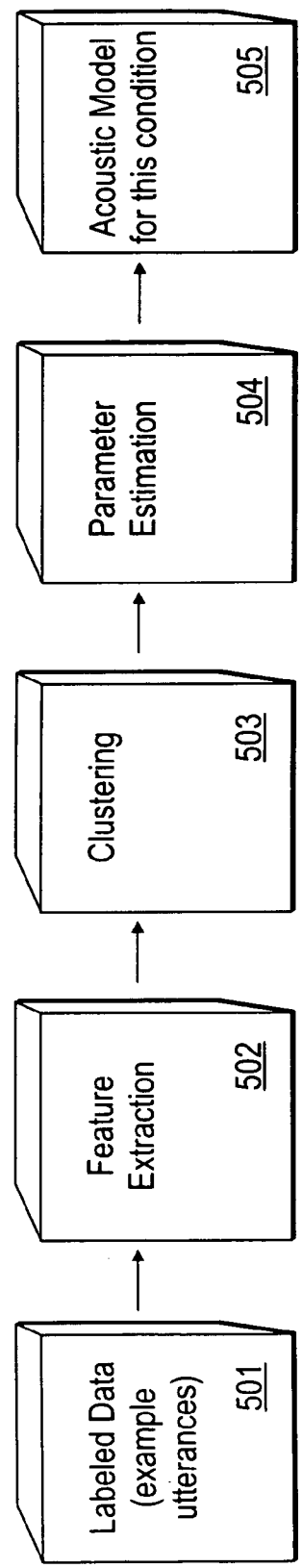
FIG. 5 illustrates a process for training a statistical classifier.

A technique by which characteristics can be detected will now be described in greater detail. FIG. 5 shows an overview of a general process that can be used to train a statistical classifier for any of the characteristics mentioned above. The process is data driven. First, data is collected and manually labeled for each of the conditions of interest (e.g., male callers, female callers) at block 501. A sequence of acoustic features is extracted for each utterance in the data set at block 502. The resulting acoustic features from all utterances are clustered at block 503 based on similarity. Parameters describing the distributions of these clusters (typically means, variances, and weights for Gaussian mixtures) are estimated from the clustered features at block 504. Collectively, these parameters describe an acoustic model 505 for the corresponding manually labeled condition.

The acoustic feature vectors include short-time estimates of the spectral components of the signal (e.g., the spectral envelope) and the rate of change and acceleration of these components (temporal derivatives of the short time estimates). They may also include short-time estimates of pitch, the presence of voicing, and the rate of change and acceleration of these.

In cases where there is a limited set of possible classifications (e.g., only "male" or "female" in the case of speaker's gender), acoustic models can be built from a large collection of example utterances for each classification (e.g., male and female). This leads to classification-specific acoustic models (e.g., male models and female models).

Figure 6:
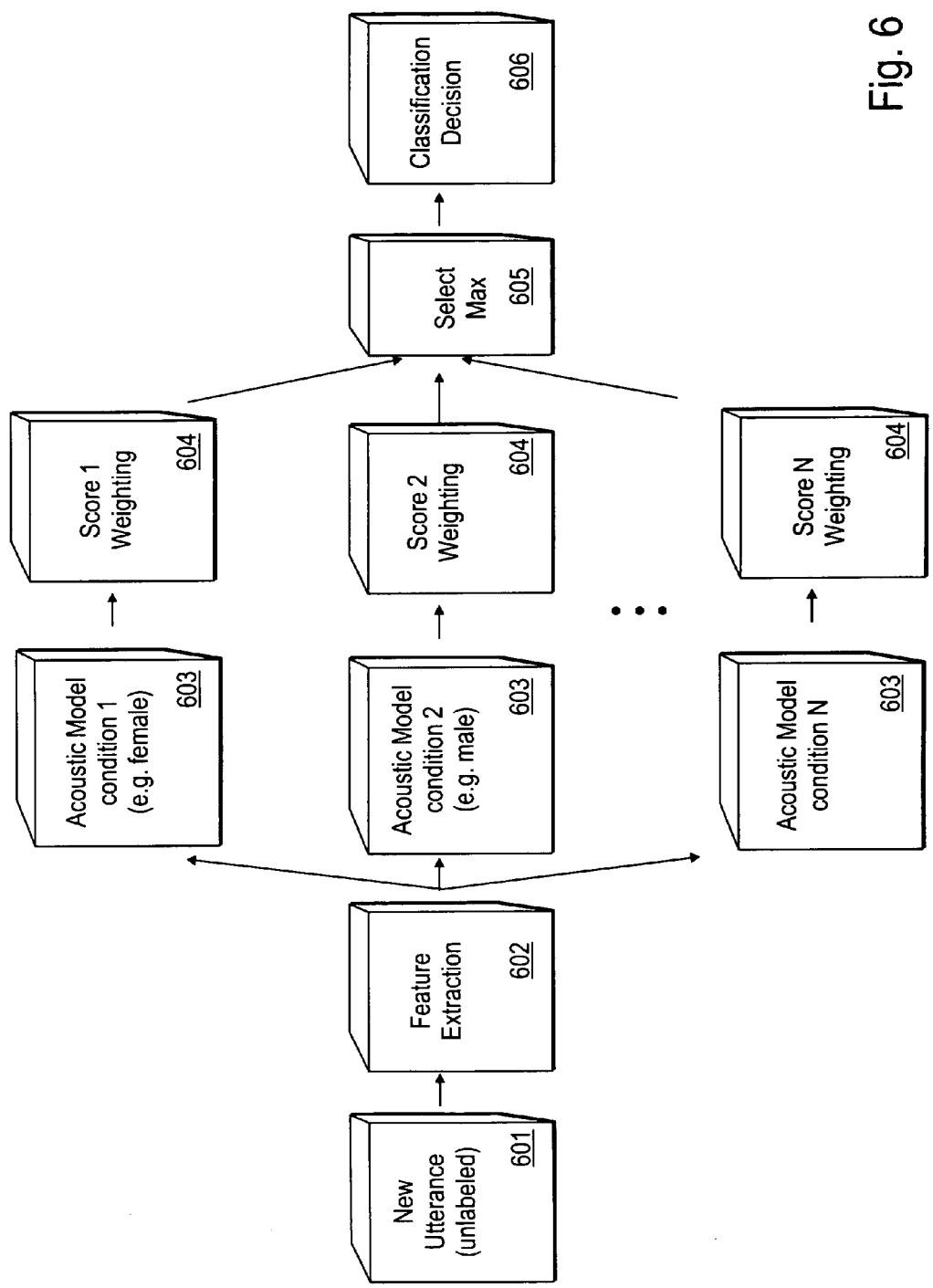
FIG. 6 illustrates a process of using training classification-specific acoustic models to make classification decisions.

FIG. 6 shows a process by which the above-mentioned acoustic models can be used to make classification decisions, i.e., to detect characteristics. A new (unlabeled) utterance 601 of the speaker is received by the speech recognition system, and a sequence of acoustic features is extracted from the new utterance at block 602. Each classification-specific acoustic model 603 is then evaluated at points described by the sequence of features. The evaluation of the model at each point in the sequence provides an estimate of the probability of observing each feature vector given a specific acoustic model. Total scores for each model are accumulated over the sequence of features by adding the weighted log of the probability of each feature vector. These scores correlate to the probability of the feature sequence for the new utterance given each condition-specific acoustic model (i.e., male or female).

The total scores are weighted at blocks 604 by the expected likelihood for each condition (e.g., the expected percentage of male and female callers) and, if desired, by additional weights to correct for any asymmetric cost functions (if, for example, the cost of misclassifying a man were higher than misclassifying a woman). After this weighting, the model corresponding to the highest score is selected at block 605 to determine the classification decision 606, i.e., to detect the characteristic.

In cases where there are many possible classifications (e.g., in the case of classifying the speaker's emotional state), the following approach can be used. Labeled data is collected and acoustic models are built for the classification to be detected (e.g., the emotional state, "frustrated"), and additional, background acoustic models are built from data representing other emotional states not to be explicitly detected. The same process as described with respect to FIG. 6 can be used, and the final decision of choosing the model with the highest score now represents a detection decision. If, for example, the system is used to detect frustration of the speaker, and the background model scores higher than the acoustic model trained with speech from frustrated callers, then the decision (the characteristic detection) is that the caller is not frustrated. When a background modeling approach is used, it may be desirable to require that the detected model score higher than the background model by more than a tunable threshold.

This same approach can be used to detect essentially any characteristics. For example, to detect gender, male and female models are used; to detect type of speech, models of side speech, background speech, fast and slow speech, accented speech and normal speech are used. Similarly to detect the use of a hands-free telephone vs. a hand-held telephone, or "in a bar" vs. "at an airport," models built from data collected for each condition can be used.

The above-described approach is most effective when only a small number of classification decisions are to be made (e.g., female vs. male, or hands-free vs. hand-held) for any given utterance. When a large number of classifications are required simultaneously, however (e.g. age, gender, speech type, and environment type), the above approach may require an undesirably large number of data collections and acoustic models. For these applications, instead of building explicit acoustic models for every possible classification, caller-independent transforms can be used to map acoustic models from one channel to generate a synthesized model in a new channel not yet seen. Transforms of this type can be created by using the techniques described in U.S. Pat. No. 6,233,556 of Teunen et al., which is incorporated herein by reference.

For example, this separation of channel and speaker allows a set of age-classification models trained from data collected in relatively noiseless ("clean") hand-held environments to be used to detect a caller's age in a more noisy, hands-free environment. In this case, generic transforms for mapping clean handheld acoustic data to hands-free data are applied to the individual age classification models, to generate synthetic age classification algorithms for hands-free environments.

Figure 7:
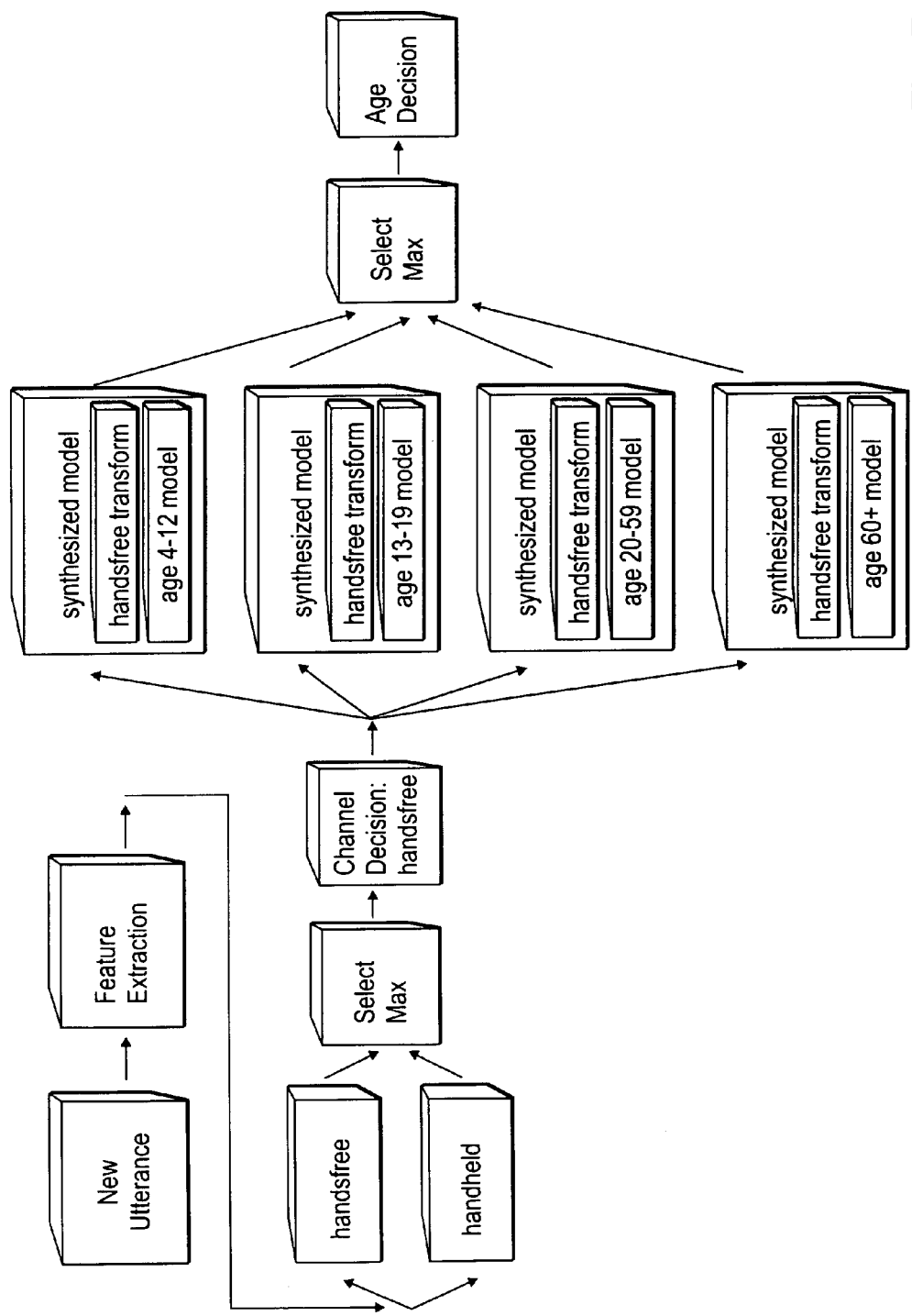
FIG. 7 illustrates a process of applying multiple simultaneous classifications to make a classification decision, using caller-independent transforms.

In one embodiment of a system that makes both channel-type and speaker-related classifications, the channel (e.g., hand-held vs. hands-free) is first identified from models adapted for specific channels. Then, the speaker classification (e.g., age) is identified by choosing from models that are synthesized for that environment by applying the caller-independent transforms. FIG. 7 illustrates an example of this process in the case where the channel classification is between "hands-free" and "hand-held", and the age classification is from among the age groups 4-12, 12-20, 20-60, and 60 and above.

As noted above, the automatic detection of characteristics may also include direct measurements. For example, the log magnitude of the speech level and background noise level, and the difference between these quantities (the SNR), can also be used to customize dialogs. The background noise level can be computed by averaging measurements of the intensity of the input signal over regions that are not detected as speech by the recognition system. Similarly the speech level can be determined by averaging measurements of the input intensity in regions that are detected as speech. On a log scale, the difference between these measurements is the SNR.

Speech level, background noise level, and SNR can also be used in combination with other measurements, including the history of previous errors, the length of the speaker's utterance, the utterance's confidence score, the prompt duration, start of speech delay and barge-in, to detect why the speaker encountered an error. A statistical classifier as described above could determine the most likely cause of error, although a classifier using another technology, such as neural networks, decision trees or discriminant analysis might alternatively be used.

III. Dialog Customization

Selected examples of customizing a dialog at the application level will now be described in greater detail. One customization which can be done using this approach is call routing, where the technology routes a call from a person based on the detected characteristic(s). After one or more characteristics of the caller (speaker) and/or his environment are detected, algorithms determine if and where the call should be routed, based on the detected characteristics. For example, if a native Spanish speaker in the Southeastern U.S. calls into a system, the system may detect his Spanish accent. After detection, a system component matches the detected accent with contact information for bilingual, Spanish-speaking operators. The system then forwards the call to the bilingual operators for improved service.

A second type of dialog customization available is in error recovery dialogs. In this approach, detected characteristics are used in conjunction with errors returned from the recognition engine to improve the error recovery dialogs. If the application detects that an underlying speaker or acoustic characteristic is relevant to an error that the speaker has just encountered, the dialog strategy can be customized to help the speaker recover from the error. For example, if a recognition error is returned and the customization logic detects a likely cause of the error, such as high background noise, then the dialog can be adjusted to inform the speaker about the probable cause of the error and possibly attempt to correct for it. In the case of background noise, the prompt might say something like, "Sorry, I'm having trouble understanding because there seems to be a lot of noise. I might have an easier time if you move to a quieter area."

A third approach is customizing content, one example of which is advertising content. In this approach, detected characteristics are used in conjunction with a dynamic source of content to customize content provided to the speaker. Algorithms are closely linked with the dynamic content, so customized content/dialogs can be presented to the speaker. Consider the case of a young female caller in a drugstore speech application. In this case, the young female caller may have a stronger interest in particular pharmaceutical products than an older male caller. Thus, she may want to hear certain dialogs that contain particular advice and product recommendations, while the older male caller will want to hear different dialogs. In this case, the system first detects the speaker characteristics (e.g., age and gender) and acoustic characteristics. Algorithms then interact with the detected characteristics to determine if and how the content should be dynamically served in the dialog. The end result is a dialog that is tailored to the young female caller.

Another approach is to customize prompt delivery, such as to customize speed and/or pausing within and between prompts. In this approach, detected characteristics are used to determine if the prompts should be sped up or slowed down and if pauses should be inserted or shortened. If certain speaker or environmental characteristics are detected that align with preferred prompt speeds and pausing by speaker and environment, prompt speed parameters and pausing algorithms can be adjusted accordingly. For example, an elderly speaker may want to hear slower prompts with more pauses between sentences, than a younger person would prefer. The speaker ultimately hears an adjusted dialog if these parameters are adjusted.

Yet another approach is to customize the system persona. The persona is the "personality" of the voice output by the speech recognition system. Personas can vary from being very business-like and formal to being very informal and non-mainstream. Certain types of speakers may respond more favorably to certain types of personas. For example, a caller from Texas might respond more favorably to a persona with a Texas accent. The process flow of this approach can be very similar to that of speed and pausing customization. However, rather than modifying speed parameters and pausing algorithms, different prompts are used that reflect a different system persona.

Another approach is to customize prompt style. A prompt style is similar to a persona, but it is the wording of the recorded messages and prompts, rather than being a combination of the prompt wording and voice (as in the case of persona). For example, if the system detects that the speaker is using a hands-free device, the system may avoid prompt wording that makes reference to using the touchtone keypad. The process flow of this approach can be very similar to that of speed and pausing customization. However, rather than modifying speed parameters and pausing algorithms, different prompt wording is used. Prompt style can also be used for text-to-speech synthesis. For example, if a speaker from the Southern U.S. is identified, the system might insert slang or other words associated with that region, such as "y'all."

Another approach is to customize call flow. Call flow refers to the order in which a caller hears a series of prompts. An older caller may wish to hear slower, more explicit information. For example, if the system detects that the caller is frustrated, then the system might select a call flow embodying a back-off strategy to ensure the caller has better success, or the customization logic might transfer the frustrated caller to a human operator. The process flow of this approach can be very similar to that of content customization. However, rather than content being dynamically served, the flow of the call is dynamically modified based on expected caller preferences and that match different call flow options to detected characteristics.

Yet another approach is to customize grammars. Grammars describe the set of words the speech recognition engine is expecting the caller to say at any given point in time. Within this set of expected utterances, certain words and phrases are marked as more probable or not. Grammar customization is important, because speech recognition accuracy depends upon using the most relevant grammar and properly weighting the probabilities of words within these grammars. Dialog customization can be used to dynamically switch grammars for different callers to optimize recognition accuracy. The process flow of this approach can be very similar to that of content customization. However, rather than content being dynamically served, grammars are automatically switched or adjusted based on detected characteristics.

IV. Computer System Implementation

The speech recognition system described above can be implemented using one or more general-purpose computing platforms, which may be, for example, personal computers (PCs), server-class computers, and/or small form factor computing devices (e.g., cellular telephones and personal digital assistants (PDAs)), or a combination thereof. FIG. 8 is a block diagram showing an abstraction of the hardware components of such a computer system. Note that there are many possible implementations represented by this abstraction, which will be readily appreciated by those skilled in the art given this description.

The illustrated system includes one or more processors 81 (i.e. a central processing unit (CPU)), read-only memory (ROM) 82, and random access memory (RAM) 83, which may be coupled to each other by a bus system 88 and/or by direct connections. The processor(s) 81 may be, or may include, one or more programmable general-purpose or special-purpose microprocessors, digital signal processors (DSPs), programmable controllers, application specific integrated circuits (ASICs), programmable logic devices (PLDs), or a combination of such devices. The bus system (if any) 88 includes one or more buses or other connections, which may be connected to each other through various bridges, controllers and/or adapters, such as are well-known in the art. For example, the bus system 88 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 88 are one or more mass storage devices 84, an audio processing module 85, a data communication device 87, and one or more other input/output (I/O) devices 86. Each mass storage device 84 may be, or may include, any one or more devices suitable for storing large volumes of data in a non-volatile manner, such as a magnetic disk or tape, magneto-optical (MO) storage device, or any of various forms of Digital Versatile Disk (DVD) or CD-based storage, or a combination thereof.

The data communication device 87 is one or more data communication devices suitable for enabling the processing system to communicate data with remote devices and systems via an external communication link 90. Each such data communication device may be, for example, an Ethernet adapter, a Digital Subscriber Line (DSL) modem, a cable modem, an Integrated Services Digital Network (ISDN) adapter, a satellite transceiver, or the like. Other I/O devices 86 may be included in some embodiments and may include, for example, a keyboard or keypad, a display device, and a pointing device (e.g., a mouse, trackball, or touchpad).

Of course, certain components shown in FIG. 8 may not be needed for certain embodiments. For example, a data communication device may not be needed where the ASR system is embedded in a single processing device. Similarly, a keyboard and display device may not be needed in a device which operates only as a server.

The above-described processes and techniques for characteristic detection, dialog customization, and data analysis may be implemented at least partially in software, which may be stored and/or executed on a computer system such as shown in FIG. 8. For example, such software may be software 89 residing, either entirely or in part, in any of ROM 82, RAM 83, or mass storage device(s) 84. Such software may be executed by the processor(s) 81 to carry out the above-described processes. Alternatively, the above-described processes and techniques can be implemented using hardwired circuitry (e.g., ASICs, PLDs), or using a combination of hardwired circuitry and circuitry programmed with software.

Thus, a method and apparatus for customizing a human-machine dialog or analyzing data relating to human-machine dialogs, based on detection of characteristics associated with one or more dialogs, have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method comprising:
   establishing a speech-based dialog between a person and a machine during a call, wherein the person uses a communication device to speak to the machine via a communication channel during the call;
   automatically detecting a characteristic during the dialog in real time, wherein the characteristic is a characteristic of the person, the communication device, the communication channel, or an environment in which the person is located during the dialog, but the characteristic does not uniquely identify the person, the communication device, or any user account; and
   selecting a destination to which the call should be routed, based on the detected characteristic, and not based on the meaning of any speech or the failure to recognize any speech during the dialog.

2. A method as recited in claim 1, wherein the characteristic is an approximate age of the person.

3. A method as recited in claim 1, wherein the characteristic is the gender of the person.

4. A method as recited in claim 1, wherein the characteristic is a type of speech being spoken by the person.

5. A method as recited in claim 1, wherein the characteristic is an emotional state of the person.

6. A method as recited in claim 1, wherein the characteristic is indicative of the truthfulness of speech of the person.

7. A method as recited in claim 1, wherein the characteristic is an acoustic characteristic.

8. A method as recited in claim 1, wherein the characteristic is indicative of a speech level of the dialog.

9. A method as recited in claim 1, wherein the characteristic is descriptive of a reason the person is experiencing an error.

10. A method as recited in claim 1, wherein the characteristic is a type of communication device the person is using to communicate with the machine.

11. A system as recited in claim 1, wherein the characteristic is a type of communication device the person is using to communication with the machine.

12. A method as recited in claim 1, wherein the characteristic is indicative of a noise level.

13. A method as recited in claim 12, wherein the characteristic is indicative of an acoustic noise level of the dialog.

14. A method as recited in claim 12, wherein the characteristic is indicative of a signal noise level of the dialog.

15. A method as recited in claim 1, wherein the characteristic is a noise level of an acoustic environment in which the person is located.

16. A method as recited in claim 15, wherein the characteristic is a noise type of an acoustic environment in which the person is located.

17. A method as recited in claim 15, wherein the characteristic is the level of reverberance of an acoustic environment in which the person is located.

18. A system comprising:
    a front end to generate a set of features in response to speech from a person during a dialog with the person, wherein the person uses a communication device during a call communicate with the system via a communication channel;
    a set of models;
    a speech recognition engine to recognize the speech from the person based on the features and the models;
    a characteristic detector to detect a characteristic of the person, the communication device, the communication channel, or an environment in which the person is located during the dialog, wherein the characteristic does not uniquely identify the person, the communication device, or any user account; and
    a call routing unit to select a destination to which the call from the person should be routed, based on the detected characteristic, and not based on the meaning of any speech or the failure to recognize any speech during the dialog.

19. A method as recited in claim 18, wherein the characteristic is an approximate age of the person.

20. A system as recited in claim 18, wherein the characteristic is the gender of the person.

21. A system as recited in claim 18, wherein the characteristic is a type of speech being spoken by the person.

22. A system as recited in claim 18, wherein the characteristic is an emotional state of the person.

23. A system as recited in claim 18, wherein the characteristic is indicative of the truthfulness of speech of the person.

24. A system as recited in claim 18, wherein the characteristic is an acoustic characteristic.

25. A system as recited in claim 18, wherein the characteristic is indicative of a speech level of the dialog.

26. A system as recited in claim 18, wherein the characteristic is descriptive of a reason the person is experiencing an error.

27. A system as recited in claim 18, wherein the characteristic is indicative of a noise level.

28. A system as recited in claim 27, wherein the characteristic is indicative of an accoustic noise level of the dialog.

29. A system as recited in claim 27, wherein the characteristic is indicative of a signal noise level of the dialog.

30. A system as recited in claim 18, wherein the characteristic is a noise level of an accoustic environment in which the person is located.

31. A system as recited in claim 30, wherein the characteristic is a noise type of an acoustic environment in which the person is located.

32. A system as recited in claim 30, wherein the characteristic is the level of reverberance of an acoustic environment in which the person is located.

33. A method comprising:
    establishing a speech-based dialog between a person and a machine, wherein the person uses a communication device to communicate with the machine via a communication channel during the dialog;

automatically detecting a characteristic during the dialog in real time, wherein the characteristic is a characteristic of the person, the communication device, the communication channel, or an environment in which the peson is located during the dialog, and wherein the characteristic does not uniquely identify the person, the communication device, or any user account; and dynamically customizing a call flow of the dialog for the person during the dialog, based on the detected characteristic, and not based on the meaning of any speech or the failure to recognize any speech during the dialog.

34. A method as recited in claim 33, wherein the characteristic is a characteristic of the person's speech during the dialog.

35. A method as recited in claim 33, wherein the characteristic is the person's gender or approximate age.

36. A method as recited in claim 33, wherein the characteristic is the person's emotional state.

37. A method as recited in claim 33, wherein the characteristic is an acoustic characteristic.

38. A method as recited in claim 33, wherein the characteristic is a type of communication device the person is using to communicate with the machine.

* * * * *